RAYMOND M. SNOW
INVENTOR
HUEBNER, BEEHLER,
WORREL & HERZIG
ATTORNEYS

United States Patent Office 2,936,660
Patented May 17, 1960

2,936,660

PICKER BAR SWAGING TOOL

Raymond M. Snow, Fresno, Calif.

Application January 15, 1957, Serial No. 634,355

8 Claims. (Cl. 78—14)

The present invention relates to swaging apparatus and more particularly to a swage for shaping workpieces by the application of reforming forces successively applied along lines radial to a predetermined center. The apparatus has special application to the salvage of worn cotton picker spindle bars by constricting the bars about replacement bearings positioned therein to assure proper bearing alignment.

Conventional cotton pickers provide a multiplicity of tubular picker bars each of which mounts a plurality of picker spindles. In one known commercial picker, thirty picker bars are employed. Spindle drive shafts are rotatably mounted in each of the picker bars in a series of bearings interposed the drive shaft and the bars and, in turn, mount bevelled drive gears in driving engagement with bevelled driven gears on the spindles. The picker bars are mounted for travel in a circuitous path and during such travel, the drive shafts rotate to the spindle in their picking and doffing operation.

It has been found that over a period of use, indentations or grooves are worn in the picker bar by the bearings on the spindle drive shaft. Thereafter, the bearings shift laterally in the bar and fail to maintain the spindle drive shaft precisely positioned in the picker bar. Any movement of the spindle drive shaft out of exact concentricity in the picker bar causes disengagement or improper meshing of the spindle drive and driven gears thereby resulting in faulty operation of the spindles and the cotton picker as a whole.

To counter this problem in the past, it has been necessary to replace the defective picker bars. Because of their multiplicity, the cost of such replacement has been heavy.

Although the present invention was conceived and is conveniently described for use in solving the above noted problem in mechanical cotton pickers, it will be readily apparent as the description proceeds that the invention has many other applications.

Therefore, it is an object of this invention to provide an improved swaging apparatus.

Another object is to provide an apparatus for forming an area of predetermined configuration internally of a tubular workpiece by swaging forces applied externally thereof.

Another object is to shape tubular members so that peripheral portions in excess of 180° thereabout are concentrically constricted to a predetermined radius about a predetermined center.

Another object is to reduce the cost of correcting faulty picker bars in a cotton picking machine by enabling their repair rather than requiring their replacement.

Another object is to enable mounting of a workpiece to be swaged in a predetermined position having a precise relationship to the path of movement of a tool used in swaging the workpiece.

Other objects are to provide an improved swaging apparatus which is economical to make and use, dependable, durable, adaptable to a variety of applications, and which is highly effective for accomplishing its intended purposes.

These and other objects will become more fully apparent upon reference to the following description.

In the drawings:

Fig. 6 is a somewhat enlarged horizontal section taken on line 6—6 of Fig. 2.

Figure 1:
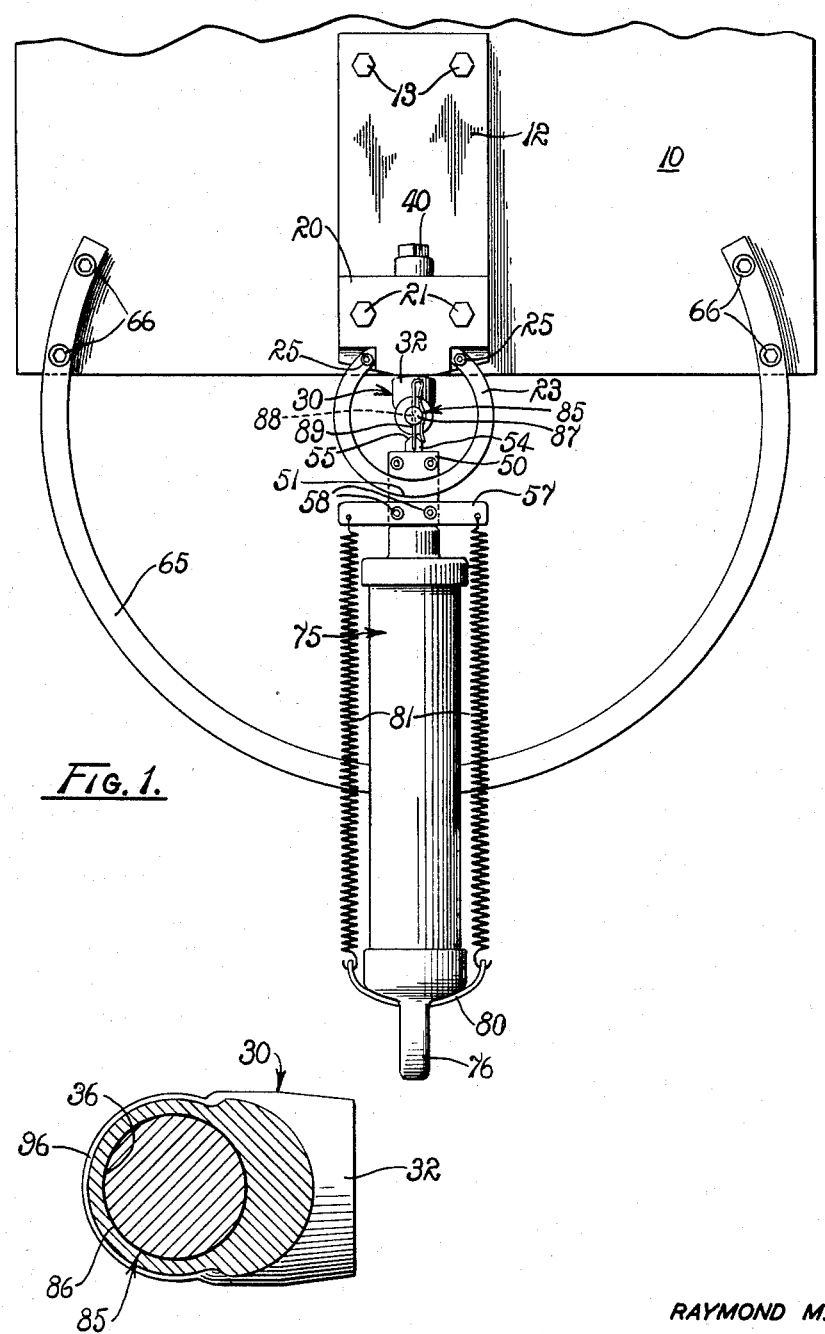
Fig. 1 is a fragmentary top plan view of a swaging apparatus embodying the principles of the present invention illustrated in association with a picker bar of a mechanical cotton picker.
Figure 2:
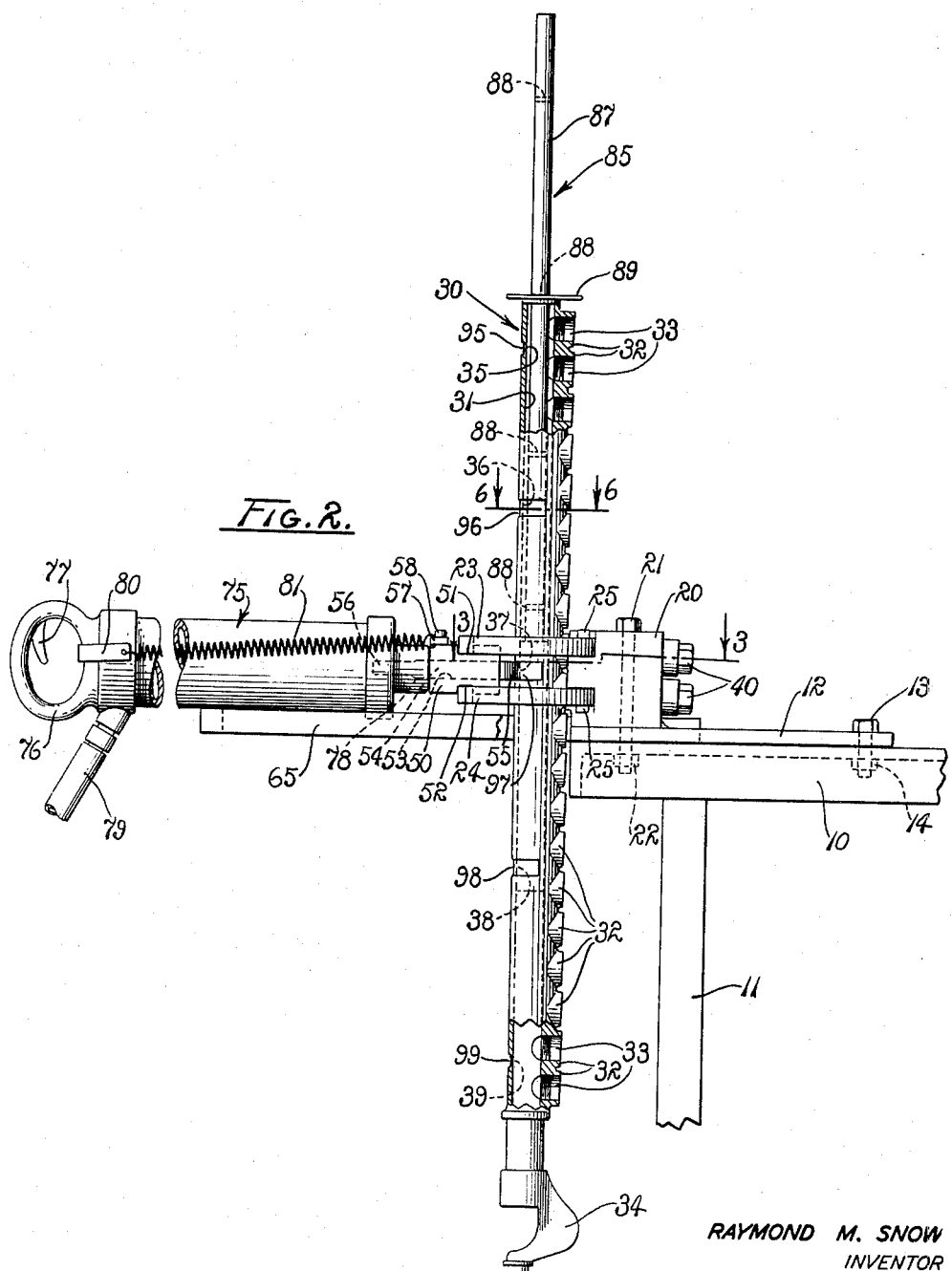
Fig. 2 is a fragmentary side elevation of the swaging apparatus and picker bar shown in Fig. 1.
Figure 3:
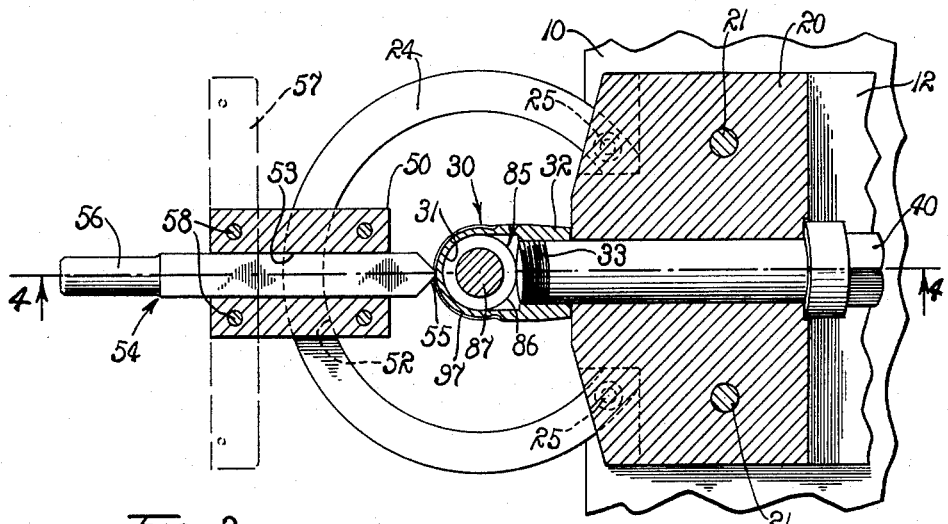
Fig. 3 is a somewhat enlarged horizontal section taken on line 3—3 of Fig. 2. It is to be noted that the air hammer shown in Fig. 2 is omitted in Fig. 3.

Referring more particularly to the drawings, a substantially horizontal support table 10 is fragmentarily shown in Figs. 1 and 2 and is conveniently supported by legs, as 11. A base plate 12 is secured to the top of the table by means of short mounting bolts 13 extended through the plate and the table and having nuts 14 screw-threadably turned on lower ends thereof. A mounting block 20 is likewise secured to the base plate 12 by a pair of long mounting bolts 21 extending downwardly through the block, the base plate and the table. Nuts 22 are screw-threadably received on lower ends of the mounting bolts. Substantially horizontal, vertically spaced upper and lower tracks 23 and 24 of circular curvature and of the same size have ends on the mounting block by studs 25 extended through the tracks and threadably received into the block. It is to be noted that the tracks are outwardly extended from the block and are positioned coaxially of each other in parallel relation.

A conventional tubular picker bar 30, best seen in Fig. 2, and constituting a workpiece, provides a longitudinal bore 31 having an internal cylindrical wall or surface therearound and a row of aligned longitudinally spaced stub nipples 32. The nipples have internally threaded bores 33 opening outwardly of the picker bar and extended transversely thereof. It is to be noted that the bores provide axes acutely angularly related to a plane normal to the longitudinal axis of the picker bar. Although of no particular significance insofar as the present invention is concerned, the picker bar is shown to include a cam arm 34.

At this point it is to be remembered that the picker bar 30 is of the type employed in mechanical cotton pickers and that in the ordinary use of the bar, a spindle drive shaft, not shown, is inserted within the bore 31 and spindle drive shaft bearings, also not shown, are interposed the drive shaft and the picker bar at longitudinally spaced positions therealong. During operation these bearings tends to wear internal grooves in the wall of the bore of the picker bar in planes normal to the bar between the nipples. The locations or areas of such grooves are generally indicated in Fig. 2 at 35, 36, 37, 38, and 39.

Figure 4:
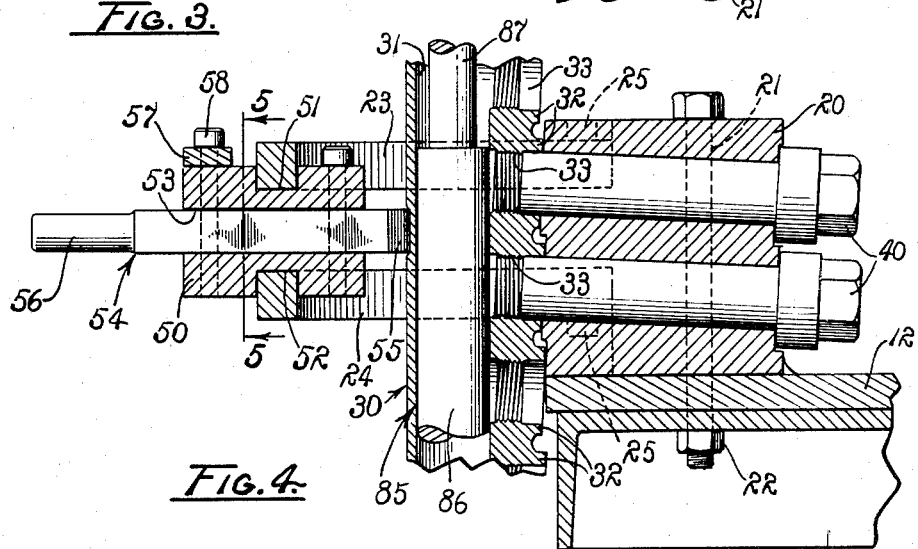
Fig. 4 is a fragmentary vertical section taken at the position represented by line 4—4 in Fig. 3.
Figure 5:
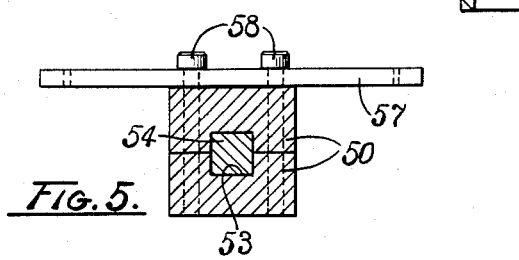
Fig. 5 is a vertical section taken on line 5—5 of Fig. 4.

For swaging the picker bar 30, it is mounted in substantially vertical position with the bore 31 thereof disposed concentrically within the upper and lower tracks 23 and 24 and successively vertically positioned to locate each of the areas 35 to 39, which it is desired to swage, in turn midway between the lower tracks. For this purpose a pair of elongated positioning bolts 40 are extended forwardly through the mounting block 20 and screw-threadably received into successive pairs of adjacent transverse bores of the bar 33, as most clearly seen in Fig. 4.

A carriage slide block 50 provides upper and lower slots 51 and 52 slidably fitted to the upper and lower tracks 23 and 24, respectively, for reciprocal slidable movement of the carriage along the tracks. It is to be noted that the tracks provide for movement of the carriage along a path in adjacent uniformly spaced relation to the picker bar 30 and have a curvature concentric to the center of the picker bar. The carriage has an opening 53 of rectangular cross section extended therethrough and disposed transversely radially of the tracks. A swaging tool 54 is slidably received in the opening and provides a bevelled workpiece engaging end 55 and an oppositely extended shank 56. The swaging tool is thus adapted for reciprocal slidable movement radially of the tracks to and from engagement with the picker bar 30. A cross bar 57 is secured by bolts 58 to the carriage block in transverse relation to the opening therein.

A support rail 65 also of circular curvature provides ends mounted on the table 10 by means of bolts 66 extended through the rail and threadably received into the table. The rail extends outwardly of the table beneath the tracks 23 and 24 in concentric circumscribing relation to the tracks, as best seen in Fig. 1. It is to be noted at this point that although the tracks and the rail are shown as only fractional portions of a circle, they could just as well form complete circles. The construction shown is preferred because of its simplicity.

An air hammer 75 is shown in Figs. 1 and 2 and includes a handle 76, an operating trigger 77, a tool-received socket 78, and an air hose 79 adapted to be connected to a source of air under pressure, not shown. An arcuate cross piece 80 is secured to the hammer adjacent to the handle and extends transversely outwardly of the hammer. For use with the swaging device of the present invention, the hammer is rested on the support rail 65 at approximately the center of gravity of the hammer. The swaging tool 54 is received in the socket 78, and the hammer is held in this position by tension springs 81 which connect coresponding opposite ends of the cross piece 80 and the cross bar 57. Actuation of the hammer reciprocates the swaging tool in the carriage 50, and the springs are adapted to hold the hammer against the tool and to prevent its accidental disengagement therefrom during operation.

An elongated mandrel 85 is slidably fitted in the bore 31 of the picker bar 30 and provides an outer cylindrical surface 86 adapted to contact the inner wall of the bore in close sliding engagement therewith. The mandrel has an endwardly extended stem 87 in which is provided a plurality of diametric, longitudinally spaced bores 88. The mandrel is supported in selected positions in the picker bar by the extension of a pin 89 through selected bores 88 and with opposite ends of the pins rested on the upper end of the picker bar, as clearly seen in Fig. 2. The mandrel is of an external diameter equal to the external diameter of bearings, previously referred to, which it is desired to fit in the picker bar 30 when it has been reconditioned.

Operation

The operation of the described embodiment of the present invention is believed readily apparent and is briefly summarized at this point. The picker bar 30 is initially removed from the cotton picking machine, not shown, and the spindles, spindle drive shaft, and bearings, likewise not shown, disassembled therefrom. The bearing areas 35 through 39 may be located and marked on the outside of the bar, if desired.

The bar 30 is then held in substantially vertical position within the tracks 23 and 24 and the positioning bolts 40 are extended through the mounting block 20 and screw-threaded into adjacent bores 33 so as to position one of the bearing areas, as 37, between the tracks. The mandrel 85 is next slid into the bore 31 of the picker bar so that it extends through the bearing area 37, selected to be worked on. The pin 89 is fitted through an appropriate bore 88 in the stem 87 of the mandrel so as to support the mandrel in this position.

The air hammer 75 is then rested on the support rail 65, the socket 78 fitted over the shank 56 of the swaging tool 54, and the springs 81 connected between the crosspiece 80 and the crossbar 57. The operator grasps the handle 76, and pulls the trigger 77 to actuate the hammer which reciprocates the swaging tool 54 to and from engagement with the picker bar 30. The hammer is reciprocally moved by the operator back and forth along the rail 65 thereby to move the swage in a path defined by the tracks 23 and 24 concentric to the bore 31 of the picker bar.

It will be apparent that this enables repeated hammering externally against the picker bar 30 along a peripheral segment thereof which by proper positioning of the bolts 40 in the bores 33 coincides with the internally grooved portion of the bar worn by the bearings in the manner described. The constant hammering of the tool 54 against the picker bar forces the metal in this area radially inwardly against the mandrel 85. This removes the groove and reshapes the inner wall of the bore 31 into its original cylindrical form. It will be obvious that the mandrel insures that the metal is forced into its exact shape concentric to the axis of the picker bar. The carriage block 50 and the hammer are permitted to move on tracks 23 and 24 and the rail 65 through a wide angle around the bar to enable the swaging of a wide segment thereof.

Ordinarily the worn or groved bearing areas, as indicated at 35 to 39, circumscribe the bore 31 of the picker bar prior to being swaged. It has been found, however, that it is only necessary to swage approximately 220 degrees of the periphery of the area dependably to hold replacement bearings in precise position. When a closely fitted spindle bearing, not shown, is again positioned within the bar adjacent to the swaged area, it is not able to shift laterally in the bore inasmuch as the unswaged arc remaining is now only 140 degrees and is too small to receive the bearing. It will also be recognized that bearing wear of the spindle bars 30 is least through the unswaged 140° disposed toward the spindle nipples 32.

After the groove 37 of the picker bar 30 has been removed throughout the peripheral 220°, the positioning bolts 40 are unfastened and the picker bar moved upwardly or downwardly so that the other areas 35 to 39 may be positioned between the tracks 23 and 24. The positioning bolts are once again extended through the mounting block 20 and into the proper transverse bores 33. Additionally, if necessary, the mandrel 85 is repositioned and the operation of the air hammer 75 described above is repeated.

Following this same procedure, all of the internally grooved areas 35 to 39, or segments thereof, are removed leaving a series of externally swaged areas 95, 96, 97, 98, and 99 which have been forced inwardly by the swaging tool 54.

The spindle drive shaft including new bearings, not shown, is then inserted into the picker bar 30 after removing the mandrel 85 and releasing the positioning bolts 40. Inasmuch as the grooved bearing areas 35 through 39 have been reformed, the new bearings are slidably received in the bore 31 and precisely position the spindle drive shaft concentrically in the picker bar. The mandrel is preferably of such diameter in relation to the bearings that after the bar is swaged the bearings must be pressed into position by the drive shaft. Such pressed fit assures proper bearing alignment and obviates bearing rotation in the bar and resultant internal wear.

The invention has been found to result in considerable savings to users of cotton pickers inasmuch as repair of picker bars in the described manner can be done at a cost which is a small fraction of the present replacement cost of picker bars. It is apparent that the present invention alleviates one of the objections to cotton picking machines which have fallen into disfavor by many as a result of their high cost of operation and maintenance. It is to be understood, however, that the subject invention is useful in the swaging of many other workpieces where similar problems are involved and comparable solutions are desired.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. For use with an elongated picker bar having an inner substantially cylindrical longitudinal bore, an internal groove in a plane substantially normal to the bar, and an outer surface, a bar apparatus adapted to swage the bar into the internal groove comprising a support, a track having a circular curvature mounted on the support in a predetermined plane, means mounting the bar with the bore disposed concentrically within the track and normal to the plane thereof, a carriage mounted on the track for oscillatory movement therealong, a swaging tool mounted in the carriage transversely of the track for reciprocal movement substantially radially of the bore in the plane of the internal groove to and from engagement with the outer surface of the bar, powered hammering means providing a tool-receiving socket, and means mounting the hammering means on the support transversely disposed to the track for oscillatory movement along a path concentric to the track and outwardly spaced therefrom and with the socket receiving the swaging tool therein for imparting said reciprocal movement to the tool incident to actuation of the hammering means.

2. In an apparatus for swaging an elongated tubular workpiece having a longitudinal bore providing a substantially cylindrical wall, there being a plurality of longitudinally spaced internal grooves worn in the cylindrical wall; a substantially horizontal support, a mounting block secured on the support, substantially horizontally positioned upper and lower tracks of circular curvature mounted on the block in vertically spaced relation, means mounting the workpiece on the block in substantially vertical position with the bore precisely concentric to the tracks and with an internal groove of the workpiece between the tracks, a carriage block having upper and lower grooves respectively slidably fitted to the upper and lower tracks for oscillatory slidable movement therealong and having an opening extended therethrough transversely radially of the tracks, a swaging tool slidably received in the opening of the carriage block for reciprocal slidable movement to and from engagement with the workpiece externally of the internal groove, a support rail of circular curvature mounted in substantially horizontal position on the table in concentric circumscribing relation to the tracks, an air hammer mounted transversely on the rail for reciprocal slidable movement therealong having a tool-receiving socket fitted over the swaging tool, and resiliently flexible means tensioned between the carriage block and the hammer for yieldably urging the tool and the socket into fitted engagement.

3. In an apparatus for swaging an elongated picker bar of a cotton picking machine, said bar having a row of spaced internally threaded transverse bores opening outwardly of the bar aligned longitudinally of the bar and a longitudinal bore providing a substantially cylindrical wall, there being a plurality of longitudinally spaced internal grooves in the cylindrical wall; a substantially horizontal table, a mounting block secured on the table, substantially horizontally positioned upper and lower tracks of circular curvature mounted on the block in vertically spaced relation, a pair of threaded mounting bolts extended through the block and screw-threadably received in a pair of adjacent transverse bores of the picker bar thereby to mount the bar in substantially vertical position with the bore precisely concentric to the tracks and with an internal groove of the picker bar located between the tracks, a carriage block having upper and lower grooves respectively slidably fitted to the upper and lower tracks for oscillatory slidable movement therealong and having an opening extended therethrough transversely radially of the tracks, a swaging tool slidably received in the opening of the carriage block for reciprocal slidable movement to and from engagement with the picker bar externally of the internal groove, a support rail of circular curvature mounted in substantially horizontal position on the table in concentric circumscribing relation to the tracks, an air hammer mounted transversely on the rail for reciprocal slidable movement therealong having a tool-receiving socket fitted over the swaging tool, and resiliently flexible means tensioned between the carriage block and the hammer for yieldably urging the tool and the socket into fitted engagement.

4. A swaging apparatus comprising a rigid mounting block, a pair of congruent circular tracks mounted in substantially horizontal position on the mounting block in vertically spaced parallel relation and vertical alignment, a carriage block fitted between the tracks having grooves slidably fitted to the tracks permitting slidable movement of the carriage block along the tracks while constraining the carriage block to substantially constant relation to the tracks, the carriage block having an elongated tool receiving passage extended therethrough in radial relation to the tracks, a swaging tool slidably fitted to the passage in the carriage block, a cross arm mounted on the carriage block transversely of the tool and exteded to opposite sides thereof, a circular support rail rigidly mounted concentrically of the tracks radially outwardly of the carriage block, powered hammer means slidably rested on the rail in releasable driving association with the tool, resilient tension means interconnecting opposite ends of the cross arm and the hammer means, and means for mounting a work piece concentrically within the tracks for impingement of the swaging tool thereagainst.

5. A swaging apparatus, for elongated picker bars of cotton pickers having longitudinal bores and laterally disposed internally screw-threaded nipples, which bars receive bearings and during use have internal grooves worn therein by the bearings in planes transversely of the bars between the the nipples, said apparatus being adapted to swage the bars inwardly from externally of the grooves for refitting of bearings thereto, comprising means adapted for screw-threaded engagement in the nipples of a picker bar to mount the bar for swaging operation, a carriage, a swaging tool mounted in the carriage, and means interconnecting the bar mounting means and the carriage for relative rotational movement of one with respect to the other with the swaging tool disposed in the plane of an internal groove of the bar, said tool being mounted in the carriage for reciprocal movement to and from bar engagement.

6. A swaging apparatus for elongated picker bars of cotton pickers having longitudinal bores which receive bearings and during use have internal grooves worn therein by the bearings in planes transversely of the bars, said apparatus being adapted to swage the bars inwardly from externally of the grooves for refitting of bearings thereto, comprising a mounting block, circular track means mounted on the block in a plane in fixed relation thereto, means mounting such a bar in the block with the bore thereof concentric to the circular track means and with the bar substantially normal to the plane of the track means and the planes of the grooves parallel to the track means, a carriage block mounted on the track means, the mounting block and the carriage block being associated for relative oscillatory movement by the slidable mounting of one thereof on the track means, and a swaging tool mounted in the carriage block for reciprocal slidable movement in a plane of a groove of the bar to and from engagement with the bar externally of an internal groove thereof while oscillatively positioned about the bar, the bar mounting means being releasably engageable with the bar at predetermined positions spaced longitudinally thereof successively to locate the various grooves in the plane of the swaging tool.

7. A swaging apparatus for elongated picker bars of cotton pickers having longitudinal bores which receive bearings and during use have internal grooves worn therein by the bearings in planes transversely of the bars and laterally disposed internally screw-threaded nipples, said apparatus being adapted to swage the bars inwardly from externally of the groove for refitting of bearings thereto, comprising a mounting block, circular track means mounted on the block in a predetermined plane, bolts extended through the mounting block screw-threadably engaged in the nipples of such a bar mounting the bar on said block with the bore thereof concentric to the track means and with the bar substantially normal to the plane of the track means, a carraige block mounted on the track means, the mounting block and the carriage block being associated for relative oscillatory movement by the slidable mounting of one thereof on the track means, a swaging tool mounted in the carriage block for reciprocal slidable movement in the plane of an internal groove of the bar to and from engagement with the bar externally of said groove, a substantially circular rail mounted in concentric circumscribing relation to the tracks, and powered means releasably engaged with the swaging tool borne by the rail for oscillatory movement therealong in alignment with the tool.

8. The swaging apparatus of claim 5 including an air hammer operatively associated with the swaging tool and mounted for relative rotational movement with the tool with respect to the bar, and resilient means interconnecting the hammer and the tool urging them into continuous operative association.

References Cited in the file of this patent

UNITED STATES PATENTS

| | | |
|---|---|---|
| 641,317 | Moore | Jan. 16, 1900 |
| 720,052 | McKibben | Feb. 10, 1903 |
| 737,952 | McKibben | Sept. 1, 1903 |
| 747,272 | Tierney | Dec. 15, 1903 |
| 1,129,191 | Gefvert | Feb. 23, 1915 |
| 1,281,091 | Spillane | Oct. 8, 1918 |
| 1,404,512 | Chapman | Jan. 24, 1922 |
| 1,860,729 | Braund | May 31, 1932 |
| 2,303,059 | Misfeldt | Nov. 24, 1942 |
| 2,338,157 | Allen | Jan. 4, 1944 |